Patented Feb. 12, 1935

1,990,923

UNITED STATES PATENT OFFICE 1,990,923

PROCESS OF PURIFYING ALKYLATED-PHENYL-AZO-AMINO-PYRIDINES

Edmond T. Tisza and Bernard Joos, Yonkers, N. Y., assignors to The Pyridium Corporation, Nepera Park, N. Y., a corporation of New York No Drawing. Application June 16, 1930, Serial No. 461,627

7 Claims. (Cl. 260—42)

This invention is an improvement in alkylated azo-amino-pyridines, such as, tolyl-beta-azo-alpha-alpha-diamino-pyridines, and in methods of preparing the same, and more particularly in pure preparations of the substance free from harmful by-products for use in the treatment of germ infections.

One of the primary objects of the present invention is the provision of a substance or substances, particularly adapted for use in the treatment of germ infections, and particularly those of the genito-urinary tract.

The preferred substances which are suitable for use in medicinal preparations have the probable formula $$R_1—R—N=N—R_2$$

where $R_1$ represents a lower alkyl group of the type $$C_nH_{2n+1}$$

R represents a monocyclic radicle of aromatic properties, and $R_2$ represents a diamino-pyridyl nucleus.

We have isolated and identified three isomers of tolyl-beta-azo-alpha-alpha-diamino-pyridine, namely, the ortho, the meta and para, all of which are of similar character, and have similar physical characteristics.

The substances are obtained by diazotizing a solution of an isomer of toluidine in hydrochloric acid solution, and adding alpha-alpha-diamino-pyridine in dilute hydrochloric acid to the diazonium salt solution. An example of the method of preparation is given below.

Example

We dissolve 10.7 gms. o-toluidine, m-toluidine, or p-toluidine, in 50 c. c. of water, and 52 c. c. hydrochloric acid of 21%. The solution is cooled to 3° C., and diazotized in the usual way, with a 10% solution of sodium nitrite, (6.9 gms. in 69 c. c. of water). A solution of 11 gms. alpha-alpha-diamino-pyridine in 50 c. c. of water and 10 c. c. of concentrated hydrochloric acid is then added to the diazonium salt solution. Copulation begins at once, and the mixture is set aside for two hours. The acidity is then reduced by means of a saturated solution of sodium acetate, until a slightly acid reaction is obtained with congo paper. After standing two hours, the hydrochloride of the isomer of tolyl-beta-azo-alpha-alpha-diamino-pyridine is collected on a suction filter, washed with water and dried.

The three compounds, when made according to the above described process, may contain some mineral matter, or other particularly harmful by-products, such as phenolic by-products. As their solubility in hot water is not very great, the recrystallization out of water is not practicable. To make them suitable for medicinal use, the following process of purification is preferred. First, the free base of the substance is prepared as above described and washed well with water. It is then dissolved in acetone or other suitable organic solvents, filtered, and a calculated amount of hydrochloric acid added. The hydrochloride of the tolyl-beta-azo-alpha-alpha-diamino-pyridine crystallizes out, almost quantitatively. It is collected, washed with the solvent used, and dried in a vacuum oven at 45° C.

Of the isomers obtained in this manner, the ortho is a yellow micro-crystalline, and the meta and para are dark red to brownish red micro-crystalline powder. All are somewhat soluble in cold water, more so in hot water, and slightly soluble in alcohol, acetone, ether, chloroform and benzol. The corresponding base may be obtained from the hydrochloride of the isomer, by dissolving the isomer in water and precipitating the base with alkali. In each case the base occurs in light yellow needles with a melting point in the case of the ortho of 184 to 185° C. The melting point of the meta is 124.5° C., and that of the para 154-5° C. The bases of the isomers are insoluble in alkalies, very slightly soluble in water, and soluble in the common organic solvents, such as alcohol, ether, acetone, chloroform and benzol.

The three compounds above described are, as to be expected, of similar character. Since the formula for beta-phenyl-azo-alpha-alpha-diamino-pyridine, is described as

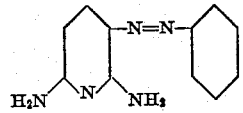

and as these compounds are made through diazotization of the three isomer toluidines, the formula for them should be as follows:—

I—Ortho-tolyl-beta-azo-alpha-alpha-diamino-pyridine

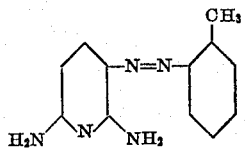

II—Meta-tolyl-beta-azo-alpha-alpha-diamino-pyridine

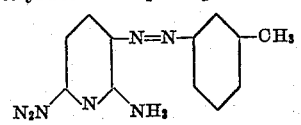

III—Para-tolyl-beta-azo-alpha-alpha-diamino-pyridine

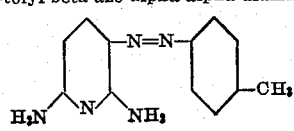

In these formulas, we have designated the beta position in the pyridine nucleus as the place for the copulation. In general, the azo group will go into para position to the amino group, or into the ortho, if the para position is occupied. In the present case, the azo group is in the para position to one, and in the ortho to the other amino group. There is a possibility that some of the gamma-azo-compound is formed, and that this isomer is present in the above described substances.

The statements as regards the formulas and in regard to the structure are theoretical and not intended as limitations.

By the expression "phenyl" utilized in the accompanying claims, is not only included the benzene ring or nucleus, but also equivalents to the coverage of which the applicant is entitled by the doctrine of equivalents according to the patent laws of the United States of America.

What is claimed as new is:

1. A process for producing a medicinal substance for use in the treatment of germ infections, which comprises linking 2,6-diamino pyridine with a diazotized isomer of toluidine to obtain an isomer of tolyl-beta-azo-diamino-pyridine and then purifying to remove phenolic by-products.

2. A process for producing a medicinal substance for use in the treatment of germ infections, which comprises linking 2,6-diamino pyridine with diazotized o-toluidine to obtain o-tolyl-beta-azo-2,6-diamino-pyridine and then purifying to remove phenolic by-products.

3. A process for producing a medicinal substance for use in the treatment of germ infections, which comprises linking 2,6-diamino pyridine with diazotized m-toluidine to obtain m-tolyl-beta-azo-2,6-diamino-pyridine and then purifying to remove phenolic by-products.

4. A process for producing a medicinal substance for use in the treatment of germ infections, which comprises linking 2,6-diamino pyridine with diazotized p-toluidine to obtain p-tolyl-beta-azo-2,6-diamino-pyridine and then purifying to remove phenolic by-products.

5. A process for producing a medicinal substance for use in the treatment of germ infections, which comprises diazotizing an isomer of toluidine, coupling the diazotized isomer of toluidine with 2,6-diamino-pyridine, forming a soluble acid salt, purifying by decomposing the acid salt by treatment with an alkali material, removing the phenolic by products, treating the purified basic material thus produced to form again an acid salt of an isomer of tolyl-beta-azo-2,6-diamino-pyridine.

6. A process of purifying alkylated phenyl azo-amino-pyridines, which comprises preparing the free base, dissolving said base in acetone, filtering the resultant solution, adding hydrochloric acid to said solution, crystallizing out the hydrochloride formed, and drying the hydrochloride under a vacuum at about 45° C.

7. A process of removing phenolic materials from alkyl-phenyl-azo-amino pyridines which comprises preparing the free base, dissolving said base in acetone, filtering the resulting solution, adding hydrochloric acid, and collecting the resulting precipitated hydrochloride.

EDMOND T. TISZA.
BERNARD JOOS.